United States Patent Office 3,538,118
Patented Nov. 3, 1970

3,538,118
AMIDOMETHANODIOXOCINS
Chun-Shan Wang, Midland, and Henry E. Hennis, Coleman, Mich., assignors to The Dow Chemical Company, Midland, Mich., a corporation of Delaware
No Drawing. Filed Mar. 25, 1968, Ser. No. 715,489
Int. Cl. C07d 7/10
U.S. Cl. 260—345.2
12 Claims

ABSTRACT OF THE DISCLOSURE

Amidomethanodioxocins having the formula

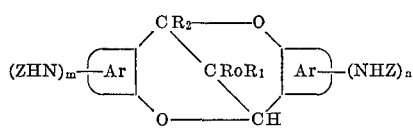

where Ar is a homocyclic or heterocyclic substituted or unsubstituted aromatic ring; $m$ and $n$ independently are integers of from 0 to 2 inclusive; $R_0$ is H; $R_1$ is H, aryl or alkyl; $R_0$ and $R_1$ may together with the C to which they are attached form the cyclohexane ring; $R_2$ is H, aryl or alkyl and Z is acyl, are produced from their corresponding aminodioxocins by a process comprising contacting said aminodioxocins with an acid chloride, anhydride, or ester. These compounds have biological activity and are also useful in resin production.

CROSS-REFERENCES TO RELATED APPLICATIONS

The new compounds disclosed herein are related to the compounds disclosed in the copending applications filed by one of us, Hennis, entilted "Methanodioxocins and a Process for Making Them," Ser. No. 669,694, filed Sept. 22, 1967; "2,2'-Trimethylenedihydroxyaromatic Synthesis," Ser. No. 669,706, filed Sept. 22, 1967; and "Aminomethanodioxocins and a Process for Making Them," Ser. No. 715,490 filed concurrently herewith.

SUMMARY OF THE INVENTION

It has now been found that new amidodioxocins are produced from their corresponding aminodioxocins by the standard, well-known ammonolysis-type reaction involving carboxylic acid derivatives. The new amidodioxocins produced have the formula

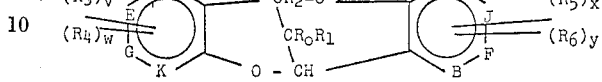

where each of $v$, $w$, $x$ and $y$ independently is a number from 0 to 4; each of A, B, E, F, G, J, K and L independently is N or CH provided that neither A and E, E and G, G and K, B and F, F and J or J and L can simultaneously be N; $R_0$ is H; $R_1$ is H, aryl having up to ten carbon atoms or alkyl having up to eighteen carbon atoms; $R_0$ and $R_1$ may together with the C to which they are attached form the cyclohexane ring; $R_2$ is H, aryl having up to ten carbon atoms or alkyl having up to eighteen carbon atoms; each of $R_3$, $R_4$, $R_5$ and $R_6$ being absent when the corresponding subscript $v$, $w$, $x$ or $y$ is 0, when present is independently aryl having up to ten carbon atoms, alkyl having up to eighteen carbon atoms, NHZ where Z is acyl having up to eighteen carbon atoms, halogen or OM where M is a hydrocarbon radical having up to eighteen carbon atoms provided that at least one of $R_3$, $R_4$, $R_5$ and $R_6$ is always NHZ and attached to a carbon atom in the E, F, K or L position; and $R_3$ combined with $R_4$, as well as $R_5$ combined with $R_6$ together with the atoms to which they are attached, may form the pyridine, pyrimidine, quinoline, benzene, naphthalene, anthracene, phenanthrene or pyran ring. A specific example of an amido compound produced is 6H, 12H-6,12-methanodibenzo[b,f][1,5]dioxocin-2-acetamide or a shorter term, MDBD-2-acetamide

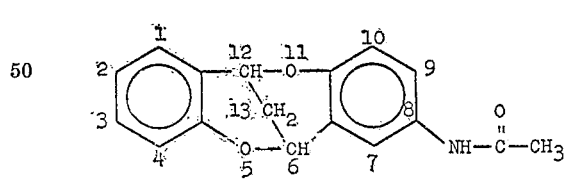

which is produced from its corresponding aminodioxocin, 2-amino-MDBD, and acetyl chloride, acetic anhydride or an acetate ester. The numerals in the above formula indicate the numbering system used herein to indicate the position of substituents.

In order to produce these new amidodioxocins, an aminodioxocin corresponding to the amidodioxocin desired is contacted in any convenient manner with a carboxylic acid derivative that is useful as an acylating agent. This type reaction is well known in the art. Suitable carboxylic acid derivatives useful as starting materials include acid halides, anhydrides and esters. For example, suitable starting materials for making an acetamidodioxocin include acetyl chloride, acetic anhydride and ethyl acetate. Other carboxylic acids from which suitable acid halides, anhydrides and esters are derived include propionic, butyric, isobutyric, lauric, palmitic, stearic, cyclohexanecarboxylic, phenylacetic, benzoic, o-toluic, o-chlorobenzoic, m-bromobenzoic, p-nitrobenzoic, phthalic, salicylic, and p-methoxybenzoic. Thus, the acyl group, Z in the above formula, can be an alkanoyl, a cycloalkanoyl, an aroyl, an aralkanoyl, an alkaroyl, a halo-alkanoyl or -aroyl, a nitro-alkanoyl or -aroyl, a hydroxy-alkanoyl or -aroyl or an alkoxy- or aryloxy-alkanoyl or aroyl.

The aminodioxocin starting materials are prepared from their corresponding nitrodioxocins by contacting the nitrodioxocins with hydrogen in the presence of a noble metal catalyst at a temperature between 0 and 60° C. as is more fully set forth in a copending application by Hennis, Ser. No. 715,490 entitled "Aminomethanodioxocins and a Process for Making Them," filed concurrently herewith, the disclosure of which is hereby incorporated by reference.

The new amidodioxocin compounds disclosed herein have biological activity. They are useful fungicides. In addition, they can be hydrogenated by the process disclosed in "2,2'-Trimethylenedihydroxyaromatic Synthesis," Ser. No. 669,706, filed by one of us (Hennis) on Sept. 22, 1967 to form an amidodihydroxy compound which is useful in the preparation of resins. The 2,2'-trimethylenediphenols produced by this hydrogenation process are unique in that they contain a "protected" amine functional group. For example, the amidodihydroxy compound is converted into an epoxy resin prepolymer by reaction with epichlorohydrin and alkali. This would not be possible with an amino group, since the latter would react with epichlorohydrin. Hydolysis of the amido group yields a free amine which reacts with terminal epoxy groups to cross-link the resulting polymer, thus producing a resin from a prepolymer with a built-in cross-linking agent.

DESCRIPTION OF SPECIFIC EMBODIMENT

Example 1

MDBD-2-acetamide: 2-amino-MDBD (0.5 g., 0.002 mole) was dissolved in 50 ml. of 10% hydrochloric acid. Small portions of 10% sodium hydroxide solution were added until the mixture became cloudy, and the turbidity was then removed by adding 5 ml. of 10% hydrochloric acid. Acetic anhydride (5 ml.) was added and the mixture was swirled vigorously for ten minutes, then a solution of 5 g. of sodium acetate in 25 ml. of water was added in one portion. The gummy material which separated from the solution was recrystallized from ethanol. After two recrystallizations from ethanol with activated carbon treatment, white needles, M.P. 173–175°, were obtained.

Analysis.—Calcd. for $C_{17}H_{15}NO_3$ (percent): C, 72.60; H, 5.34; N, 4.98. Found (percent): C, 72.7; H, 5.40; N, 5.03.

Hydrogenolysis of the heterocyclic ring system of this compound yields 1-(2-hydroxy-5-acetamidophenyl)-3-(2-hydroxyphenyl)propane. The hydrogenolysis procedure is disclosed in "2,2'-Trimethylenedihydroxy Synthesis," Ser. No. 669,706, filed Sept. 22, 1967. This bisphenol product is then reacted with epichlorohydrin and alkali to form a diglycidyl ether that can be cured by a mild hydrolysis reaction. Cross-linking will occur because the amido group will be released to an amino group to react with the terminal epoxy groups to cure the polymer. This general class of amido compounds eliminates the need for the addition and mixing of a separate curing agent in resin production.

Example 2

MDBD-2-benzamide: To a solution of 0.3 g. (0.0015 mole) of 2-amino-MDBD in 5 ml. of dry pyridine and 10 ml. of dry benzene, was added dropwise 0.3 ml. of benzoyl chloride. The resulting mixture was heated in a water bath at 60–70° for 30 minutes and was then poured into a breaker containing 100 ml. of water. The benzene layer was separated, and the aqueous solution was washed once with 10 ml. of benzene. The combined benzene solutions were washed with water and with 5% sodium carbonate solution and dried with a little anhydrous magnesium sulfate. The drying agent was removed by fifiltration and the benzene solution was evaporated to dryness. The residue was recrystallized three times from an ethanol-water mixture to give white needles, M.P. 160–162°.

Analysis.—Calcd. for $C_{22}H_{17}NO_3$ (percent): 76.97; H, 4.96; N, 4.08. Found (percent): C, 76.8; H, 5.02; N, 4.04.

This compound is a fungus inhibitor. MDBD-2-benzamide was diluted in isopropanol and diluted to 500 parts per million in warm melted agar. This agar composition was allowed to solidify and a droplet containing Trichophton mentagrophytes was placed on the surface of the MDBD-2-benzamide and agar mixture. After incubation, 50% inhibition of Trichophton mentagrophytes was obtained.

Some other new amidodioxocins which are produced from carboxylic acid derivatives and their corresponding aminodioxocins are:

MDBD-4-propionamide from 4-amino-MDBD and propionyl chloride.

MDBD - 8 - butyramide from 8 - amino - MDBD and butyric anhydride.

MDBD-10-isobutyramide from 10-amino-MDBD and ethyl isobutyrate.

MDBD-2,4-dilauramide from 2,4-diamino-MDBD and lauroyl bromide.

MDBD - 2,8 - dipalmitamide from 2,8-diamino-MDBD and palmitic anhydride.

MDBD-4,10-distearamide from 4,10-diamino-MDBD and stearoyl iodide.

MDBD - 2,4,8,10 - tetraacetamide from 2,4,8,10-tetra-amino-MDBD and acetic anhydride.

13-methyl-MDBD-4-phenylacetamide from 4-amino-13-methyl-MDBD and ethyl phenylacetate.

6-ethyl-13-methyl-MDBD-8-benzamide from 6-ethyl-8-amino-13-methyl-MDBD and benzoyl chloride.

2 - methyl - MDBD-10-o-toluamide from 2-methyl-10-amino-MDBD and o-toluic anhydride.

2-bromo-MDBD-10-p-nitrobenzamide from 2-bromo-10-amino-MDBD and p-nitrobenzoyl bromide.

6,11 - dimethyl - 7H, 13H - 7,13-methano(1,5)-benzodioxocino(3,4 - c) - quinoline - 9-salicylamide from 6,11-dimethyl - 9 - amino-7H,13H-7-7,13-methano(1,5)benzodioxocino(3,4-c)-quinoline and methyl salicylate.

2 - methoxy - MDBD-4-p-methoxybenzamide from 2-methoxy-4-amino-MDBD and p-methoxybenzoyl chloride.

1-chloro-MDBD-2-cyclohexanecarboxylamide from 1-chloro-2-amino-MDBD and cyclohexanecarboxylic anhydride.

Similarly, the amidodioxocins given in Table I below are made from their corresponding aminodioxocins and carboxylic acid derivatives.

TABLE I

[Structure diagram showing a bicyclic molecule with substituents labeled A, B, E, F, G, J, K, L on rings, with $(R_3)_v$, $(R_4)_w$, $(R_5)_x$, $(R_6)_y$ substituents, connected via $CR_2-O$ and $CR_0R_1$ with $O-CH$ linkage]

| $R_1$ | $R_2$ | $R_3$ | $R_4$ | $R_5$ | $R_6$ | $R_3+R_4$ | $R_5+R_6$ | A | B | E | F | G | J | K | L |
|---|---|---|---|---|---|---|---|---|---|---|---|---|---|---|---|
| $C_3H_7$ | $C_{16}H_{33}$ | — | $CH_3CONH$ | — | — | — | [benzene ring] | CH | CH | O | O | CH | O | CH | CH |
| $C_6H_{13}$ | Napthyl | Br | — | $C_2H_5CONH$ | — | — | [naphthalene] | O | O | CH | CH | CH | O | CH | O |
| $C_6H_{13}$ | $C_3H_7$ | $OC_{16}H_{33}$ | $C_7H_{15}CONH$ | — | Napthyl | — | [naphthalene] | CH | CH | CH | CH | CH | O | CH | O |
| Phenyl | $CH_3$ | $C_4H_9$ | — | — | $C_{15}H_{31}CONH$ | — | — | CH | CH | CH | O | CH | O | O | N |
| $CH_3$ | $C_4H_9$ | — | — | $C_{18}H_{37}CONH$ | — | — | — | O | O | O | N | N | N | O | O |
| $C_4H_9$ | Phenyl | — | cyclo-$C_6H_{11}CONH$ | $CH_3$ | $CH_3$ | [benzene] | — | CH | CH | O | O | CH | CH | O | CH |
| $C_4H_9$ | Phenyl | — | — | Phenoxy | $C_6H_5CH_2CONH$ | [benzene] | — | CH | CH | O | O | O | CH | O | CH |
| Napthyl | $C_4H_9$ | — | — | $C_6H_5CONH$ / $C_4H_9$ | — | [benzene] | — | O | O | O | O | CH | CH | CH | O |
| $C_3H_7$ / $C_{18}H_{37}$ | $C_{18}H_{37}$ / $C_4H_9$ | $C_{18}H_{37}$ o-$CH_3C_6H_4CONH$ | — | $m$-$ClC_6H_4CONH$ | — | — | [benzene rings] | CH / CH | CH / CH | O / O | O / O | CH / CH | O / O | N / O | N / O |
| $C_4H_9$ | $C_6H_{13}$ | — | — | — | — | — | [benzene] | CH | CH | O | O | CH | CH | CH | O |
| $C_7H_{15}$ | $C_{16}H_{33}$ | $CH_3$ | $p$-$O_2NC_6H_4CONH$ | $OC_{16}H_{33}$ | — | — | — | N | CH | O | O | O | CH | CH | CH |

I claim:
1. An amidomethanodioxocin compound having the formula

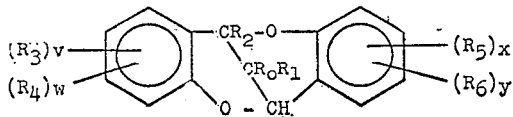

where each of $v$, $w$, $x$ and $y$ independently is a number from 0 to 4; $R_0$ is H; $R_1$ is H, aryl hydrocarbon having up to ten carbon atoms or alkyl having up to eighteen carbon atoms; $R_0$ and $R_1$ may together with the C to which they are attached form the cyclohexane ring; $R_2$ is H, aryl hydrocarbon having up to ten carbon atoms or alkyl having up to eighteen carbon atoms; each of $R_3$, $R_4$, $R_5$ and $R_6$, being absent when the corresponding subscript $v$, $w$, $x$ or $y$ is 0, when present is independently (1) aryl hydrocarbon having up to ten carbon atoms, (2) alkyl having up to eighteen carbon atoms, (3) NHZ where Z is acyl having up to eighteen carbon atoms selected from the group consisting of alkanoyl, cyclohexylformyl, benzoyl, nitrobenzoyl, phenylalkanoyl, alkylbenzoyl, halobenzoyl, phthaloyl, salicycloyl, and alkoxybenzoyl, (4) halogen or (5) OM where M is an alkyl radical having up to eighteen carbon atoms or phenyl provided that at least one of $R_3$, $R_4$, $R_5$ and $R_6$ is always NHZ and attached in the 2, 4, 8 or 10 position; and $R_3$ combined with $R_4$, as well as $R_5$ combined with $R_6$ together with the atoms to which they are attached, may form the benzene, naphthalene, anthracene or phenanthrene ring.

2. A compound as defined in claim 1 wherein $R_3$, $R_4$, $R_5$ and $R_6$ are in the 2, 4, 8 and 10 positions.

3. A compound as defined in claim 1 wherein $R_3$ and $R_5$ are in the 2 and 8 positions and $R_4$ and $R_6$ are H.

4. A compound as defined in claim 1 wherein $R_1$ is H or alkyl having up to eighteen carbon atoms.

5. A compound as defined in claim 1 wherein $R_0$ and $R_1$ are H.

6. A compound as defined in claim 1 wherein $R_2$ is H or alkyl having up to eighteen carbon atoms.

7. A compound as defined in claim 1 wherein any ring formed by the combination of $R_3$ and $R_4$ is the benzene, naphthalene, anthracene or phenanthrene ring.

8. A compound as defined in claim 1 wherein any ring formed by the combination of $R_5$ and $R_6$ is the benzene, naphthalene, anthracene or phenanthrene ring.

9. A compound as defined in claim 1 wherein $R_0$, $R_1$ and $R_2$ are H; $R_4$ and $R_6$ are NHZ; $v$ and $x$ are each 0; and $w$ and $y$ are each 1.

10. A compound as defined in claim 1 wherein Z is alkanoyl, benzoyl, nitrobenzoyl, phenalkanoyl, alkylbenzoyl, halobenzoyl, phthaloyl, salicycloyl or alkoxybenzoyl.

11. A compound as defined in claim 10 wherein $v$, $w$ and $x$ are each zero, $R_0$, $R_1$ and $R_2$ are each H and $y$ is 1.

12. A compound having the formula

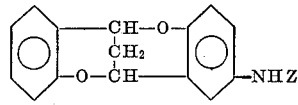

wherein Z is acetyl or benzoyl.

References Cited

Bhatia et al.: Tetrahedron Letters (1966), pp. 1717–20.
Westoo: Acta Chem. Scand., vol. 13, pp. 679–82 (1959).

HENRY R. JILES, Primary Examiner

J. M. FORD, Assistant Examiner

U.S. Cl. X.R.

260—47, 256.4, 287, 288, 295, 296, 999